May 13, 1947.  Z. W. KELLEY  2,420,601
SEATING AND FACING TOOL
Filed March 13, 1944   2 Sheets-Sheet 2
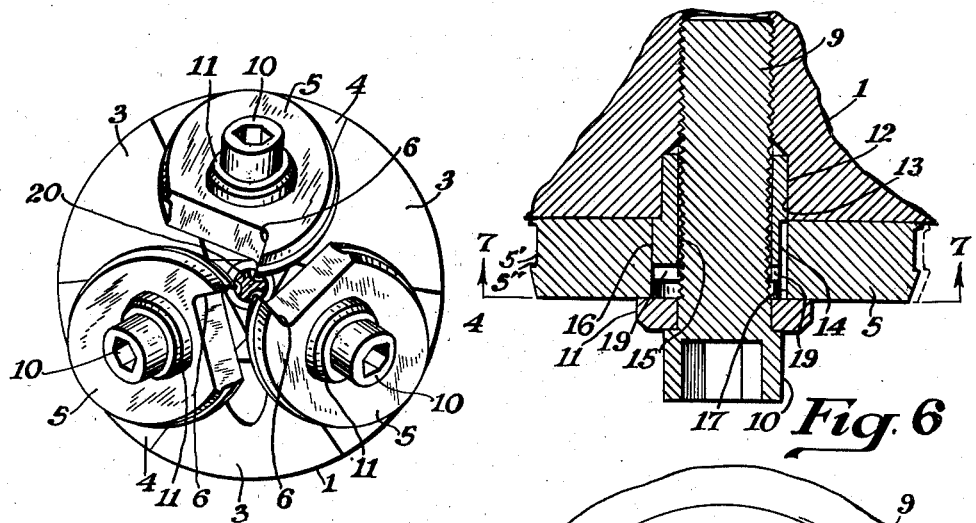
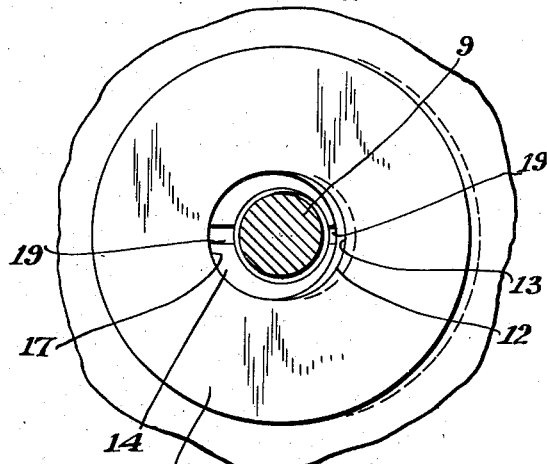
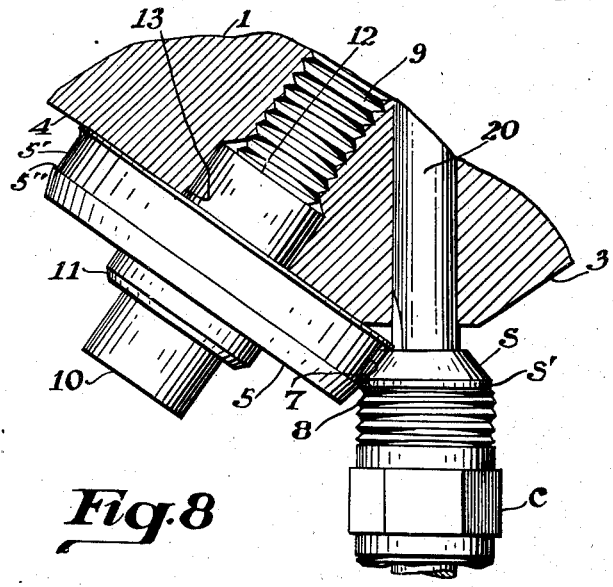
INVENTOR.
ZAR W. KELLEY.
BY
Fay, Gobrick, Chilton & Isler.
Attorneys.

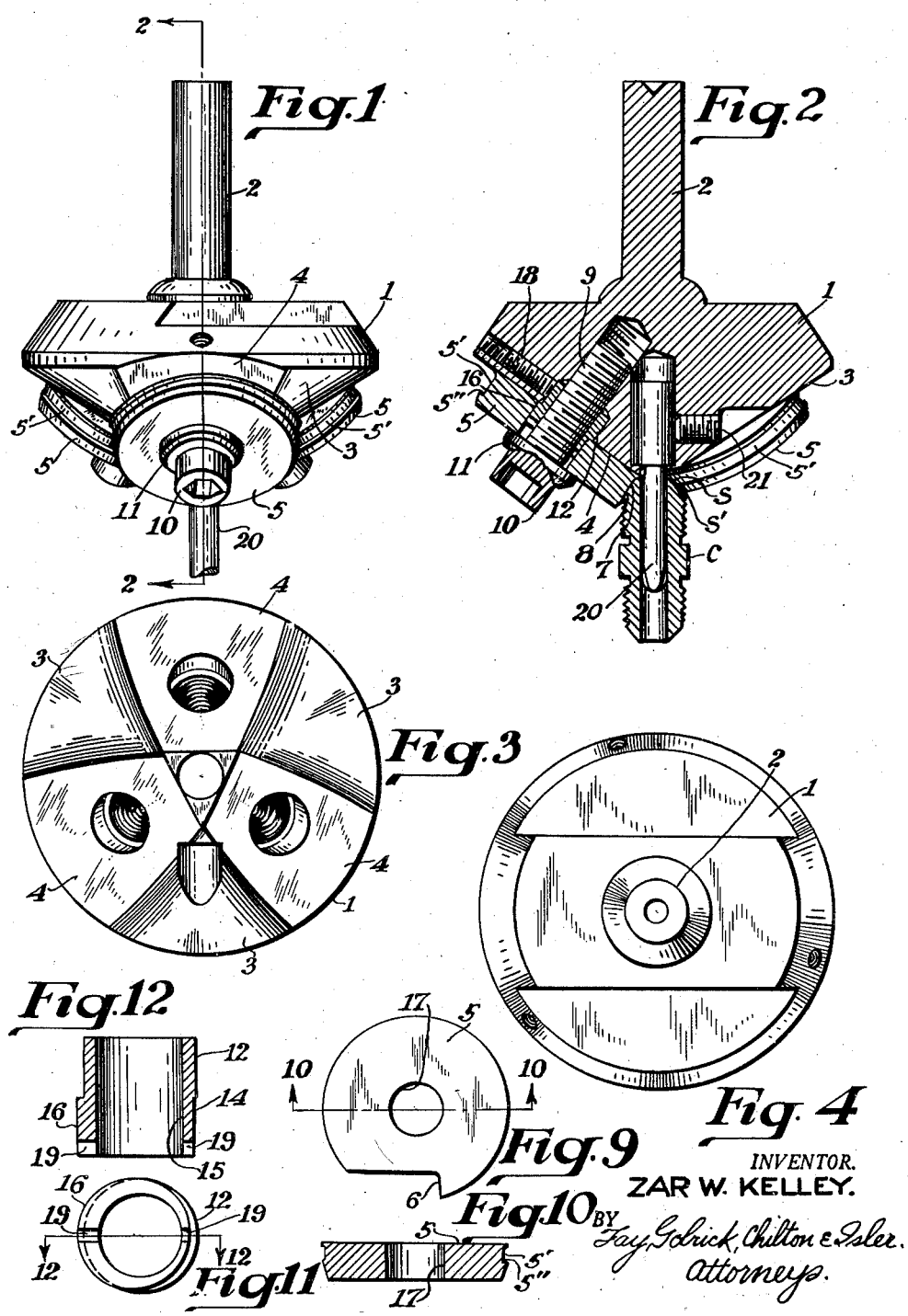

Patented May 13, 1947

2,420,601

UNITED STATES PATENT OFFICE 2,420,601

SEATING AND FACING TOOL

Zar W. Kelley, Bedford, Ohio, assignor to Z & W Machine Products, Inc., Cleveland, Ohio, a corporation of Ohio Application March 13, 1944, Serial No. 526,225

2 Claims. (Cl. 29—105.)

1

This invention relates, as indicated, to a seating and facing tool.

A primary object of the invention is to provide a tool of the character described which is extremely useful for cutting or machining seats or tapered surfaces on the ends of couplings or similar connecting elements for fuel conduits and the like, and which will have a useful life considerably longer than that of tools heretofore used for cutting such surfaces.

Another object of the invention is to provide a seating and facing tool of the character described which is so constructed as to permit the work which is being machined to be exposed to the view of the machinist to a much greater extent than heretofore possible with other tools.

A further object of the invention is to provide a tool of the character described in which a greater amount of clearance is provided for the removal or elimination of chips than is provided in other tools heretofore used for the same purposes.

Other objects and advantages of the invention will be apparent during the course of the following description.

In the accompanying drawings, forming a part of this specification, and in which like numerals are employed to designate like parts throughout the same, Fig. 1 is a side elevational view of a seating and facing tool embodying the invention;

Fig. 2 is a cross-sectional view of the tool, taken on the line 2—2 of Fig. 1, and showing also the manner in which the tool is used;

Fig. 3 is a bottom view of the body of the tool;

Fig. 4 is a top plan view of the body of the tool;

Fig. 5 is a bottom plan view of the tool;

Fig. 6 is a fragmentary cross-sectional view, showing the manner in which the disc-like cutters are mounted on the body of the tool;

Fig. 7 is a cross-sectional view taken on the line 7—7 of Fig. 6;

Fig. 8 is a fragmentary view, on an enlarged scale, of a portion of Fig. 2;

Fig. 9 is a plan view of one of the disc-like cutters;

Fig. 10 is a cross-sectional view, taken on the line 10—10 of Fig. 9;

Fig. 11 is a side elevation of one of the eccentric adjusting sleeves for the cutters, and Fig. 12 is a cross-sectional view, taken on the line 12—12 of Fig. 11.

Referring more particularly to the drawings, it will be seen that the tool comprises a body 1 having a shank 2 projecting from the rear thereof for attachment to the tool spindle holder of a lathe or other turning machine.

The body 1 of the tool has a frusto-conical front portion 3, circumferentially-spaced portions of which are removed to provide three flat surfaces 4, the centers of which, in this case, are disposed 120 degrees from each other. Each of these surfaces, it will be noted, is disposed in a plane which is at a substantial angle to the axis of the tool body.

Each of the surfaces 4 forms a seat for a cutter 5 which is in the form of a shankless circular disk having a peripheral surface, a portion 5' of which is in the form of a cylinder, and a portion 5" of which is in the form of a cone, so that when a segment or sector is removed therefrom, a cutting surface 6 is provided which terminates in a cutting edge consisting of a portion 7 which is parallel with the axis of the cutter and a portion 8 which extends angularly to the axis of the cutter. In the present case, these portions 7 and 8 are so inclined, when the cutter is mounted on the tool body, as to cut a tapered seat S and a straight shoulder s' on the end of a fuel line coupling or connector C (see Figs. 2 and 8).

When the three cutters are properly mounted, as shown in Fig. 5, the cutting surfaces 6 are equally spaced circumferentially of the tool body and are disposed in planes which substantially include the axis of the connector C.

Each of the cutters 5 is removably secured to the tool body and in engagement with a surface 4 by means of a screw 9 having a socketed head 10, a machined washer 11 being interposed between such head and one of the radial faces of the cutter.

Means are also provided for adjustment of the cutters substantially radially of surfaces 4 upon which they are mounted. Such means comprise sleeve-like members each of which consists of an annular portion 12 which is seated in a countersunk recess 13 in the tool body 1 and is concentric with the axis of the screw 9 and a portion 14 the inner surface 15 of which is concentric with the axis of the screw 9 and the outer surface 16 of which is eccentric to such axis, the portion 14 extending into a central opening 17 in the cutter 5.

The member 12—14 is maintained in position by means of a set-screw 18 which extends through the body of the tool and into engagement with the portion 12. The cutter may, however, be adjusted by first loosening the set screw 18, removing the screw 9 and washer 11 to expose the end of the member 12—14, and then turning the member 12—14 by means of a tool, such as a screw driver, which takes into transverse slots 19 in the end of the portion 14 of the member 12—14. The turning of the eccentric surface 16 causes a substantially radial movement of the cutter 5 along the surface 4.

For the purpose of insuring that the coupling or connector C is properly centered with reference to the tool as well as to steady the coupling during the machining operation, a pilot 20 is secured to the tool body centrally thereof, as by means of a set screw 21. This pilot may, of course, be replaced by pilots of various sizes, depending on the nature of the work to be machined.

In use, the coupling C will be mounted in a chuck or other holder and the tool mounted in the spindle holder of the lathe. The tool is then rotated and brought into engagement with the coupling, the pilot entering the coupling for the purposes already stated. Upon continued rotation of the tool, the cutting edges 7 and 8 will machine the surfaces S and S' respectively of the coupling.

By mounting the cutters on the tool body with their axes at an angle to the axis of the body instead of parallel therewith, as in previous tools of this type, several distinct advantages are obtained, which may be enumerated as follows:

(a) The angle of the cutting face can be changed without changing the angle of the cut.

(b) The work which is being machined is exposed to a much greater extent than heretofore possible, and is thus easily and at all times visible to the machinist and others.

(c) A greater amount of chip clearance or space for the removal or elimination of chips is provided, and (d) The cutting faces may be set ahead of the center of the work so as to increase the clearance at this point.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a seating and facing tool, a tool body having a central axis and a frustro-conical portion provided with circumferentially spaced flat faces disposed at an acute angle to the axis of the body, disc-like cutters secured against said flat faces and having apertures therethrough, said body being provided with recesses registering with said apertures in the cutters, means for adjusting said cutters radially of said body comprising sleeves having cylindrical portions journaled in the recesses in the body and eccentric portions engaging the apertures in the cutters, and means for rotating said sleeves.

2. In a seating and facing tool, a tool body having a central axis and a frustro-conical portion provided with circumferentially spaced flat faces disposed at an acute angle to the axis of the body, disc-like cutters secured against said flat faces and having apertures therethrough, said body being provided with recesses registering with said apertures in the cutters, means for adjusting said cutters radially of said body comprising sleeves having cylindrical portions journaled in the recesses in the body and eccentric portions engaging the apertures in the cutters, and means for rotating said sleeves, said body being provided with a socket in alignment with the central axis of the body, and a pilot secured in said socket.

ZAR W. KELLEY.

REFERENCES CITED

The following references are of record in the file of this patent:

UNITED STATES PATENTS

| Number | Name | Date |
|---|---|---|
| 1,642,852 | Geitner | Sept. 20, 1927 |
| 1,182,533 | Double | May 9, 1916 |
| 1,388,424 | George | Aug. 23, 1921 |
| 1,536,034 | Thomas | Apr. 28, 1925 |
| 1,874,065 | Scott | Aug. 30, 1932 |
| 2,272,200 | Hogg | Feb. 10, 1942 |

FOREIGN PATENTS

| Number | Country | Date |
|---|---|---|
| 115,648 | Germany | Nov. 28, 1900 |
| 124,260 | Great Britain | Mar. 18, 1919 |
| 374,055 | Germany | Apr. 19, 1923 |
| 353,821 | Germany | May 27, 1922 |